(12) United States Patent
Ampunan et al.

(10) Patent No.: US 8,464,068 B2
(45) Date of Patent: Jun. 11, 2013

(54) ELECTRONIC MODULE UPDATE DETECTION

(75) Inventors: Nathan Ampunan, Novi, MI (US); Carl J. Hering, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 1288 days.

(21) Appl. No.: 11/610,566

(22) Filed: Dec. 14, 2006

(65) Prior Publication Data

US 2008/0148409 A1 Jun. 19, 2008

(51) Int. Cl.
*G06F 21/00* (2006.01)

(52) U.S. Cl.
USPC .......................................................... 713/187

(58) Field of Classification Search
USPC .................. 713/187; 726/4, 17, 21, 26–30
See application file for complete search history.

(56) References Cited

U.S. PATENT DOCUMENTS

| | | | |
|---|---|---|---|
| 5,864,297 A * | 1/1999 | Sollestre et al. | 340/5.23 |
| 7,251,473 B2 * | 7/2007 | Alrabady et al. | 455/411 |
| 2003/0009271 A1 * | 1/2003 | Akiyama | 701/33 |
| 2004/0223729 A1 * | 11/2004 | Okuno et al. | 386/46 |
| 2005/0080519 A1 | 4/2005 | Oesterling et al. | |
| 2005/0090941 A1 | 4/2005 | Stefan et al. | |
| 2005/0206509 A1 * | 9/2005 | Becker et al. | 340/426.19 |
| 2005/0216903 A1 * | 9/2005 | Schaefer | 717/168 |
| 2009/0030602 A1 * | 1/2009 | Odinak et al. | 701/202 |

* cited by examiner

*Primary Examiner* — Brandon Hoffman
*Assistant Examiner* — Anthony Brown
(74) *Attorney, Agent, or Firm* — Anthony Luke Simon; Reising Ethington P.C.

(57) ABSTRACT

A method for detecting an unauthorized programming or installation of software on an electronic module on a vehicle. The method obtains information regarding programming of the electronic module. The information may be obtained by detecting a programming session of the electronic module or after the module has been programmed. The obtained information is compared with information identifying whether programming of the electronic module is authorized or unauthorized. A determination whether the programming is authorized or unauthorized is made based on the comparison.

19 Claims, 3 Drawing Sheets

ELECTRONIC MODULE UPDATE DETECTION

TECHNICAL FIELD

The present invention generally relates to the updating of electronic modules and, more particularly, to a method for detecting an unauthorized programming of an electronic module.

BACKGROUND OF THE INVENTION

Modern vehicles may have as many as fifty microprocessors on them for controlling various functions such as airbag deployment, cruise control, power distribution, braking, gear shifting in the transmission, and engine control. The microprocessors may utilize memory (firmware) that is either onboard the microprocessor or is otherwise accessible to the microprocessor and that is used to store software such as calibration constants and/or control algorithms. The processor uses the software for performing the module's designated function(s). Therefore, changing the calibration constants and/or the control algorithms affects the performance of the device or devices controlled by the electronic module. Vehicle manufacturers may provide software updates for the electronic modules even after the vehicles have been sold. The software updates may be distributed through authorized service providers such as dealerships, certified repair technicians, and the like.

Vehicle owners may desire to modify or otherwise reprogram the software in electronic module firmware to enhance performance of the vehicle. For example, aftermarket tools exist to modify the software in certain electronic modules. An experienced user may be able to change the calibration constants or control algorithms on one or more electronic modules without authorization from the vehicle manufacturer. Such changes may enable the vehicle to accelerate quicker or reach a higher top speed, but often can increase the likelihood of a mechanical failure or reduce the life of one or more engine components. Moreover, unauthorized software modifications may void a vehicle's warranty. Therefore, it may be desirable to provide a method for detecting unauthorized programming of an electronic module's firmware.

SUMMARY OF THE INVENTION

According to one aspect of the invention, there is provided a method for detecting an unauthorized programming of an electronic module. This method generally comprises the steps of: obtaining information regarding programming of an electronic module on a vehicle; comparing the obtained information with information that identifies authorized programming of the electronic module; and determining whether the programming of the electronic module is authorized based on the comparison. The programming for which information is obtained can be an attempted or completed reprogramming of the module which can be detected by, for example, monitoring for a reprogramming session message or a request for the module to enter a programming mode. Alternatively, the programming can be the existing software stored on the module which may or may not have been changed from its original state; and this software can be checked by, for example, obtaining an identification of the software (e.g., version number) and/or checking for a CRC checksum of the software.

According to another aspect, there is provided a method for detecting an unauthorized programming of an electronic module located onboard a vehicle, comprising the steps of: detecting programming in an electronic module; requesting information to verify that the programming is authorized; communicating the requested information from an in-vehicle telematics unit to a call center via wireless communication; and determining whether the programming is authorized based on a comparison of the requested information with information that identifies whether the programming is authorized.

According to yet another aspect, there is provided a method for detecting an unauthorized programming of an electronic module located onboard a vehicle, comprising the steps of: monitoring a vehicle communication bus with an in-vehicle telematics module for messages indicating the start of a programming session; detecting a message indicating the start of a programming session in an electronic module; querying the programmed electronic module for a software identification after completion of the programming session; performing a cyclic redundancy check of the programmed electronic module; communicating the software identification and the check from the telematics modules to a call center; and determining from the software identification and the check whether the programming of the module was authorized.

BRIEF DESCRIPTION OF THE DRAWINGS

Preferred exemplary embodiments of the present invention will hereinafter be described in conjunction with the appended drawings, wherein like designations denote like elements, and wherein.

DETAILED DESCRIPTION OF THE PREFERRED EMBODIMENTS

The programming detection method described below can be used to automatically detect an electronic module programming and determine whether the programming is authorized or unauthorized. The detection may occur just prior to the programming or may occur after the programming has already occurred. The method may also communicate with a call center to assist with making the determination and may inform the call center of the detection.

Communications System

Figure 1:
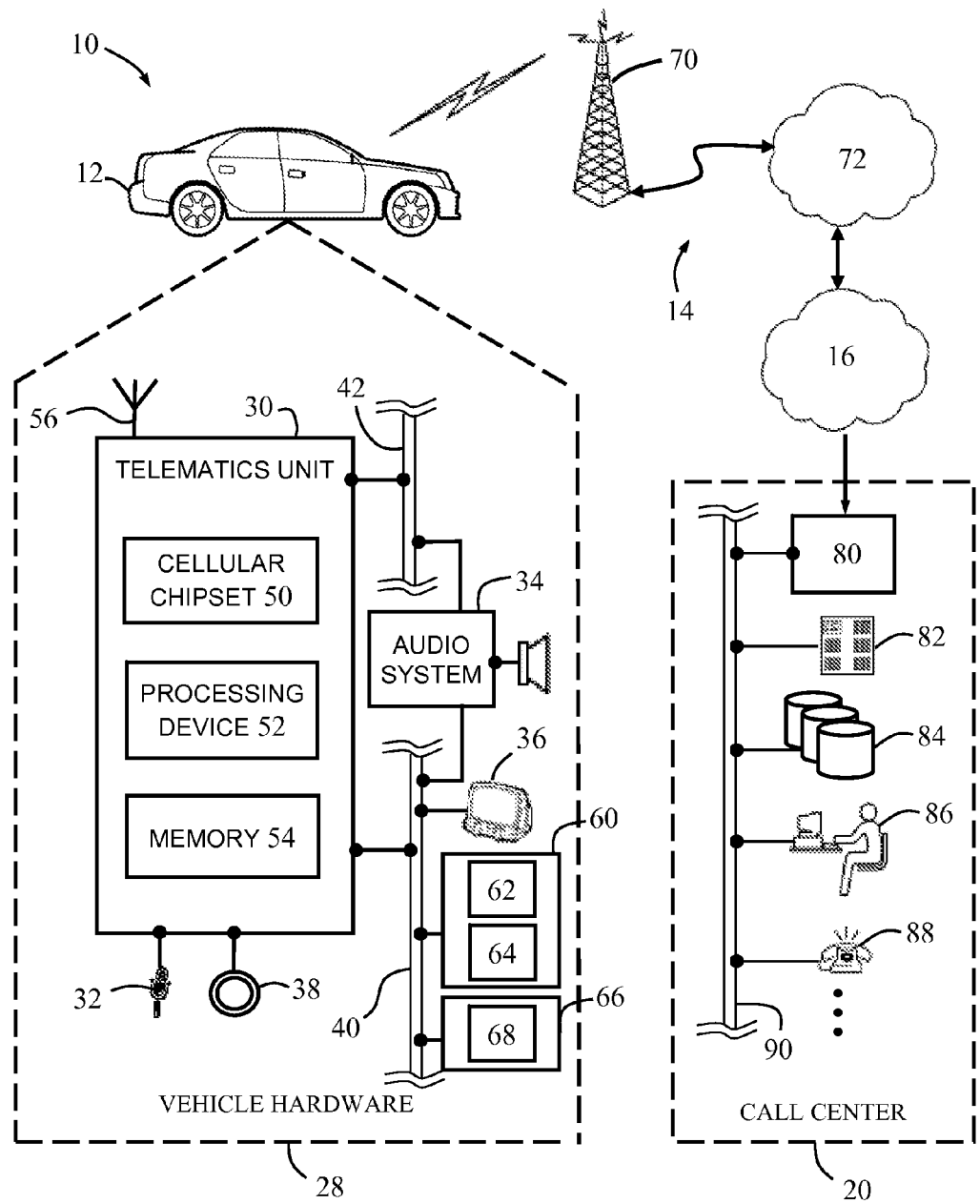
FIG. 1 is a block diagram of a system that is capable of utilizing the method for detecting an unauthorized programming of an electronic module.

Beginning with FIG. 1, there is shown an exemplary operating environment that can be used to implement the detection method disclosed herein. Communications system 10 generally includes a vehicle 12, a wireless carrier system 14, a communications network 16, and a call center 20. It should be understood that the method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, an electronic button or control 38, and one or more vehicle electronic modules (VEMs) 60, including a body control module (BCM) 66, all of which are interconnected using one or more network connections, such as a communications bus 40 or an entertainment bus 42. Examples of suitable network connections include a controller area network (CAN), a media oriented system transfer (MOST), a local interconnection network (LIN), an ethernet, a local area network (LAN), and other appropriate connections such as those that conform with known ISO, SAE and IEEE standards and specifications, to name but a few.

Telematics unit 30 is a VEM that preferably enables wireless voice and/or data communication over wireless carrier system 14 so that the vehicle can communicate with call center 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. According to one embodiment, telematics unit 30 includes a standard cellular chipset 50 for voice communications like hands-free calling, a wireless modem (not shown) for data transmission, an electronic processing device 52, one or more electronic memory devices 54, and a dual antenna 56. It should be appreciated that the modem can either be implemented through software that is stored in the telematics unit and is processed by electronic processing device 52, or it can be a separate hardware component located internal or external to telematics unit 30. The modem can operate using any number of different standards or protocols such as EVDO, CDMA, GPRS, EDGE, and WiMAX to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that enables the data sharing method discussed herein.

Telematics unit 30 provides too many services to list them all, but several examples include: turn-by-turn directions and other navigation-related services that are provided in conjunction with a GPS-based vehicle navigation unit; airbag deployment notification and other emergency or roadside assistance-related services that are provided in connection with one or more collision sensor interfaces; and infotainment-related services where music, webpages, movies, television programs, videogames and/or other information is downloaded by an infotainment unit and is stored for current or later playback. The above-listed services are by no means an exhaustive list of all of the capabilities of telematics unit 30, but are simply an illustration of some of the services that the telematics unit is capable of offering.

Vehicle hardware 28 also includes a number of vehicle user interfaces that provide vehicle occupants with a means of providing and/or receiving information, including microphone 32, audio system 34, visual display 36, and button 38. These devices allow a vehicle user to input commands, receive audio/visual feedback, and provide voice communications, to name but some of the possibilities. Microphone 32 provides an occupant with a means for inputting verbal or other auditory information, and can be connected to an automated voice processing unit utilizing human-machine interface (HMI) technology known in the art. Conversely, audio system 34 provides verbal output to a vehicle occupant and can be a dedicated, stand-alone system or part of the primary vehicle audio system. According to the particular embodiment shown here, audio system 34 is operatively coupled to both vehicle bus 40 and entertainment bus 42 and can provide AM, FM and satellite radio, CD, DVD and other multimedia functionality. This functionality can be provided in conjunction with or independent of the infotainment module described above. Visual display 36 is preferably a graphics display, such as a touch screen on the instrument panel or a heads-up display reflected off of the windshield, and can be used to provide a multitude of input and output functions. Button 38 is an electronic pushbutton or other control that is typically used to initiate communication or some other service with call center 20. Of course, numerous other vehicle user interfaces can also be utilized, as the aforementioned interfaces are only examples of some of the possibilities.

The vehicle electronic modules (VEMs) 60 are generally electronic hardware components that are located throughout the vehicle and typically receive input from one or more sensors and use the sensed input to perform diagnostic, monitoring, control, reporting and/or other functions. Each VEM 60 may include memory or firmware 62 and a microprocessor 64. The firmware 62 may store software including programming instructions and calibration tables and constants, and the like. The processor 64 executes the software to provide functionality for the VEM 60. Each VEM 60 is preferably connected by communications bus 40 to the other VEMs, as well as to the telematics unit 30, and can be designed to run various vehicle system and subsystem programs. As examples, VEM 60 can be an engine control module that monitors various aspects of engine operation such as engine oil life and ignition timing, a safety control module that regulates operation of one or more airbags in the vehicle, and the like. A second VEM in the form of BCM 66 that governs various electrical components located throughout the vehicle is also shown in FIG. 1. As will be appreciated by those skilled in the art, the above-mentioned VEM examples are only some of the types modules that may be used in vehicle 12, as numerous others are also possible. Furthermore, it should be understood that the aforementioned VEMs could be implemented in the form of software instead of being separate hardware components, they could be located within telematics unit 30, or they could be integrated and/or shared with each other or with other systems located throughout the vehicle, to cite but a few possibilities.

The BCM 66 may include a vehicle state manager (VSM) 68. The VSM 68 can work in conjunction with the telematics unit 30 to control the installation of new programming into one or more flash memories that are located in VEM 60. U.S. patent application Ser. No. 11/348,713 and U.S. Patent Application Publication No. 2005/0256614 A1 provide information concerning controlling the installation of new programming in VEM 60. Except as discussed below, that information is applicable to the illustrated embodiments. Accordingly, the complete disclosure contained in those two applications is hereby incorporated by reference.

Wireless carrier system 14 is preferably a cellular telephone system but could be any other suitable wireless system, such as a satellite-based system, that is capable of transmitting signals between vehicle hardware 28 and call center 20. According to an exemplary embodiment, wireless carrier system 14 includes one or more cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 may be a conventional land-based telecommunications network that is connected to one or more landline telephones and connects wireless carrier system 14 to call center 20. For example, land network 16 may include a public switched telephone network (PSTN) and/or a TCP/IP network, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Call center 20 is designed to provide the vehicle hardware 28 with a number of different system back-end functions and, according to the exemplary embodiment shown here, includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem can be connected to various devices such as a server 82 and databases 84. Data transmissions may also be conducted by wireless systems, such as 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and/or data transmissions.

Method for Detecting an Unauthorized Programming—

A method for detecting an unauthorized installation or programming of an electronic module 60 located onboard a vehicle 10 begins by obtaining information regarding programming of the electronic module. In different embodiments, this obtained information is used in different ways; for example, by comparing the obtained information with information that indicates whether the programming of the electronic module 60 is authorized or unauthorized. Thus, the comparison can determine whether the programming of the electronic module 60 is authorized or not. The method can also be used to prevent an unauthorized programming session from occurring based on the comparison.

Figure 2:
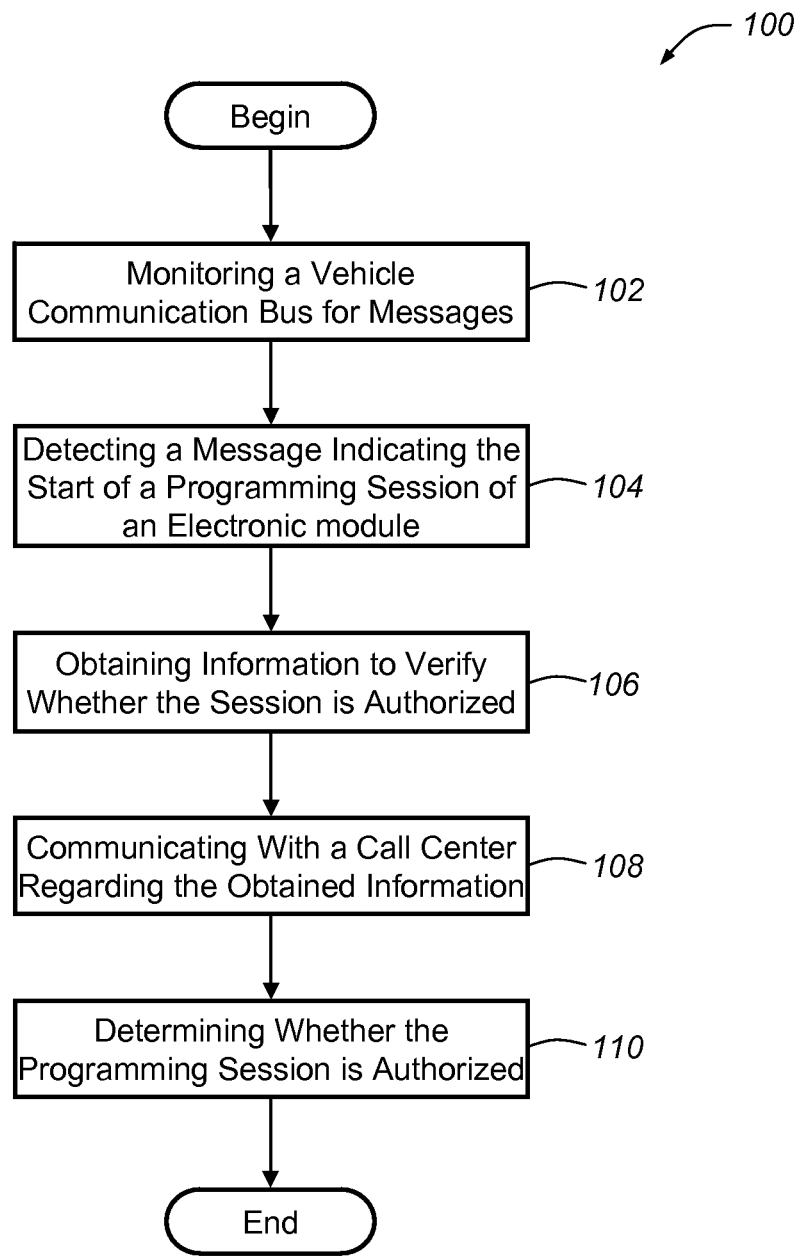
FIG. 2 is a flowchart showing some of the steps of one embodiment of the detection method.

Turning now to FIG. 2, there is shown an embodiment 100 of the method for detecting unauthorized programming of electronic modules 60. According to this particular embodiment, the method 100 begins by monitoring the vehicle communication bus 40 for messages in step 102. The monitoring may be done by a monitoring device such as the vehicle telematics unit 30, the VSM 68, the VEM 60 itself, or the like. The device may monitor for messages indicating the start of an installation or programming session of the electronic module 60. The monitoring device may continuously monitor the vehicle communication bus 40 for such messages. Alternatively, the monitoring may be periodic or may be triggered upon request by an external device. For example, the call center 20 may initiate communication with the vehicle telematics unit 30 and request the vehicle telematics unit to monitor the vehicle communication bus 40 for the initiation of an installation or programming session. In addition, the monitoring device may monitor for messages for a single electronic module 60 or to any number of such electronic modules located on the vehicle 10.

In step 104, a message indicating the start of an installation or programming session for the electronic module 60 is detected. The message may originate from any number of sources such as the call center 20, electronic modules 60, or an external programming device. For example, U.S. Patent Application Publication No. 2005/0256614A1 and U.S. patent application Ser. No. 11/348,713 which have been incorporated by reference herein provide information concerning preparing, transmission, and installation of updated software originating from the call center 20 and received by the vehicle telematics unit 30. Except as discussed below, that information is applicable to the illustrated embodiments.

One way in which messages can be detected is by monitoring of the vehicle communication bus 40. For example, the message may indicate the start of a software installation session such as a request to enter an installation mode on the vehicle bus.

The message may indicate the start of the session by requesting that all devices remain silent on the communication bus 40. In another embodiment, the monitoring device may receive a request from electronic module 60 to enter an installation session. In another alternative, the monitoring device may receive a message from the electronic module 60 to inform the device that the module has been requested to initiate or allow a software installation on the electronic module.

In step 106, information is obtained to verify whether the session is authorized. The information may be obtained by the monitoring device or by the call center 20. In one embodiment, the monitoring device may request a software identification (ID) from either the electronic module 60 to be programmed or from an external programming device that is requesting the programming to occur. The software ID may provide a version of the software to be programmed on the electronic module 60. For example, the software ID may include a version number of a calibration table to be programmed or a version of the control algorithms to be programmed on the electronic module 60. The software ID may also include other information such as a unique ID number, the date of the software's creation, the date of the software's installation on the electronic module 60, the author of the software, the version of the software, the versions of previously installed software, and the like. In another embodiment, the information obtained may include a user identification (ID). The user ID can provide information related to a device or operator requesting the installation on the electronic module 60.

Likewise, the obtained information may include the location of the vehicle 10 during the programming session. For example, the GPS unit may record the latitude and longitude of a vehicle 10 at the time of the request of the programming session. The information may be obtained prior to completion or after completion of the programming session. For example, the monitoring device may record a log of the session after the session is completed. The log file may be stored in memory on the vehicle 10, and may include information such as the software identification, the user identification, the time and/or date when the session occurred, the version of the software installed, the location of the vehicle, and the like. The log activity may also include a recordation of a cyclic redundancy check (CRC). The CRC may produce a checksum computed on the software installed on the electronic module. The CRC may be requested by the monitoring device and conducted by the electronic module 60 during or after the session.

In step 108, the vehicle 10 communicates with the call center 20 regarding the obtained information. For example, the obtained information may be communicated to the call center 20 from the telematics unit 30 via the wireless carrier system 14. Alternatively, the call center 20 may provide the vehicle 10 with information for comparing to the obtained information to determine whether the programming session is authorized. For example, the call center 20 may provide user IDs, software IDs, CRC checksums associated with the software, installation locations, and the like. Communication with the call center 20 may occur prior to completion of the session or after completion of the session.

In step 110, it is determined whether the session is authorized. The determination can be made on the vehicle 10 or at the call center 20 and can be made prior to completion of the session or after completion of the session. For example, the information communicated to the call center 20 may be used at the call center 20 to determine whether the session is authorized. In one embodiment, the call center 20 compares the user identification with known authorized user identifications to determine whether the user is authorized to install software on the electronic module 60. In another embodiment, the software identification may be compared against known authorized software for programming the electronic module. If the obtained software identification does not match one of the authorized software identifications, then the session can be determined to be unauthorized. Likewise, the obtained user IDs or software IDs can be compared with known unauthorized IDs. If the obtained IDs match the unauthorized IDs, then the session can be determined to be unauthorized.

Moreover, the CRC may verify whether the obtained software identification is a proper identification of the software installed on the electronic module. For example, an unauthorized software program may be placed on the electronic module 60 without changing the software ID located in the software. In this example, performing a CRC may determine that the software ID does not match the actual version of the software installed on the electronic module 60. Specifically, the CRC checksum may be compared with an expected CRC checksum associated with the software ID obtained from the electronic module. If the CRC checksum does not match the expected CRC checksum, then it can be determined that the software installed on the electronic module 60 is not the software indicated by the software identification. In this example, the programming session can be determined to be unauthorized.

In another embodiment, the location of the vehicle can be compared with the locations of known authorized and/or know unauthorized programming locations. Authorized programming locations can include dealerships, repair centers, and the like. If the obtained location does not match a known authorized location, the session can be determined to be unauthorized. Likewise, if the obtained location matches a known unauthorized location, the session can be determined to be unauthorized.

Likewise, the log created by the monitoring device can be used to determine whether the session was authorized by comparing the parameters described above. Alternatively, the log file can contain information such as the number of times the electronic module has been programmed, the electronic module 60 that was programmed, when the electronic module was programmed, and the like. These items can be compared with a list of authorized sessions. For example, the call center 20 may determine that a particular electronic module 60 has only ever had two authorized software versions. If the log file shows that the same electronic module has been programmed more than twice, then the call center 20 may determine that the electronic module 60 may have received unauthorized software. Likewise, if the module 60 was programmed prior to the availability of any authorized updates for that electronic module, then the call center 20 can determine that that programming session was also unauthorized. The determination can also be made using other information and comparisons.

If the determination has been made prior to the installation of new software on the electronic module 60, then the monitoring device may prevent the installation from occurring based on the determination. If the determination was made at the call center 20, then the call center can inform the monitoring device whether to allow the installation to occur. For example, the call center 20 may inform the monitoring device that the programming session is authorized. Therefore, the monitoring device may enable the programming session to occur. In one example, the monitoring device may enable the programming session to occur by ensuring that the communication bus 40 remains silent to enable the programming session to initiate properly. Alternatively, the monitoring device may enable the session to occur by communicating to the electronic module 60 that the programming session may occur.

If the programming session is unauthorized, the monitoring device may prevent the installation. For example the monitoring device may prevent the installation by preventing the communication bus 40 from remaining silent such as by sending messages to the electronic module 60 over the bus to prevent the session from initiating. Likewise, the monitoring device may provide a message to the electronic module 60 that the programming session is not authorized and thus prevent the electronic module from entering the session. Alternatively, the monitoring device can choose not to respond to the electronic module 60. The lack of response may trigger a timeout for the session and thus prevent the programming session from occurring.

Figure 3:
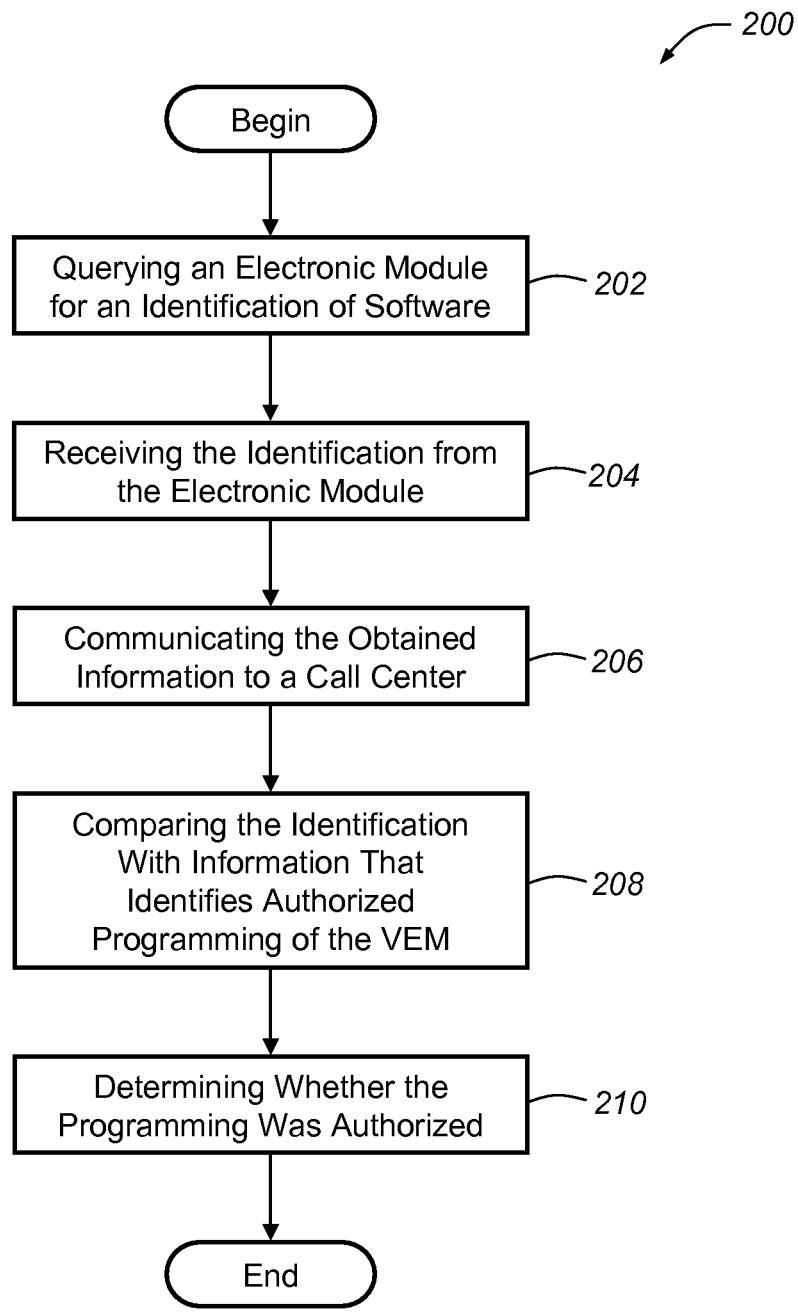
FIG. 3 is a flowchart showing the steps of another embodiment of the detection method.

Turning now to FIG. 3, there is shown some steps of another exemplary embodiment 200 of the method for detecting an unauthorized installation or programming of electronic modules 60. Beginning with step 202, the electronic module 60 is queried for an identification of software installed on the module. The monitoring device may query the electronic module 60 for the identification. The query may occur at random intervals, scheduled intervals, or upon a trigger event.

One example of a trigger event may be a request from the call center 20 to the vehicle to obtain identification information of software stored on the electronic module 60. The identification of software may include identifications such as those described above including the software identification, the CRC checksum of software, and the like.

At step 204, the identification is received from the electronic module 60. The electronic module 60 may provide the identification to the monitoring device over the vehicle communication bus 40 in response to the query. The monitoring device may query one or more electronic modules 60 on the vehicle 10. Moreover, the call center 20 may request a specific electronic module 60 or modules to be queried. Alternatively, the electronic module 60 may be integrated with the monitoring device and may share the identification internally.

At step 206, the obtained information is communicated with the call center 20. The telematics unit 30 may communicate the obtained information via the wireless system 14. The communication may occur automatically in response to receipt of the identification from the electronic module 60 or at a predefined time after receipt of the information. In one embodiment, the telematics unit 30 provides the obtained information to the call center 20. In an alternative embodiment, the monitoring device may inform the call center 20 that the monitoring device is determining whether software on the electronic module is authorized. In response, the call center 20 may provide the monitoring device with valid software identification and corresponding CRC checksum information for the electronic module 60

At step 208, the identification is compared with information identifying authorized programming of the electronic module 60. The comparison may be conducted at the call center 20 or on the vehicle 10. In one embodiment, the obtained software identification is compared with software identifications of known authorized software for the electronic module 60. In another embodiment, the CRC checksum may be compared with an expected CRC checksum associated with the obtained software identification.

At step 210, it is determined whether the programming was authorized. As described above, if the obtained software identification matches that of a known software identification for an authorized installation, then the installation may be determined to be authorized. To further verify that the software matches its obtained software identification, the CRC checksum may be compared to the expected CRC checksum of the software matching the software identification obtained. Thus, if the CRC checksum does not match the expected CRC checksum, the programming can be determined to be an unauthorized programming.

If an unauthorized installation is detected, the call center may log the unauthorized programming detection. The log may include items such as the date, the electronic module with the unauthorized programming, the software identification, the CRC checksum information, location of the vehicle where the programming was performed if known, and other such information obtained through method 200.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "like," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for detecting an unauthorized programming of an electronic module located onboard a vehicle, comprising the steps of:
   obtaining, via a wireless carrier system, information that identifies software for programming an electronic module on a vehicle;
   comparing the obtained information with identifying information of authorized software for programming the electronic module using a vehicle telematics unit;
   determining a location of the vehicle using vehicle hardware on the vehicle;
   comparing the location of the vehicle with authorized programming locations; and
   determining whether the programming of the electronic module is authorized based on the comparison of the obtained information with the identifying information and the location of the vehicle with the authorized programming locations.

2. The method of claim 1, wherein the obtaining step further comprises monitoring a vehicle communication bus for a message on the bus indicating a programming session.

3. The method of claim 1, wherein the obtaining step further comprises identifying a request to enter a programming mode.

4. The method of claim 1, wherein the obtaining step further comprises querying the electronic module for an identification of software stored on the module.

5. The method of claim 1, wherein the obtaining step further comprises querying an electronic module for a cyclic redundancy check checksum of software on the module.

6. The method of claim 1, further comprising the step of communicating the obtained software from an in-vehicle telematics unit to a call center via a wireless network.

7. The method of claim 1, wherein the step of comparing the obtained information with identifying information of authorized software further comprises comparing an identification of software stored on the module with an identification of authorized software.

8. The method of claim 7, wherein the step of comparing the obtained information with identifying information of authorized software further comprises comparing a cyclic redundancy check checksum of the software on the module with an expected checksum.

9. The method of claim 1, wherein the obtaining step further comprises logging a detection of a programming session.

10. The method of claim 9, wherein the comparing step further comprises comparing a log of the detected programming session with a list of authorized programming sessions.

11. The method of claim 1, further comprising the step of preventing programming of the module when the determination concludes that the programming is unauthorized.

12. A method for detecting an unauthorized programming of an electronic module located onboard a vehicle, comprising the steps of:
- detecting programming of an electronic module using a vehicle telematics unit;
- accessing a log of software programming sessions that includes an identity of the electronic module and either the number of times the electronic module has been previously programmed or a time at which the electronic module was programmed, or both;
- comparing the log of software programming sessions with previously-authorized software programming sessions; and
- determining whether the programming is authorized based on a comparison between the log of programming sessions and a list of previously-authorized software programming sessions.

13. The method of claim 12, further comprising preventing the programming of the module if it is determined that the programming is not authorized.

14. The method of claim 12, wherein the detecting step further comprises monitoring a vehicle communication bus for a message indicating a programming of the module.

15. The method of claim 14, wherein the determining step further comprises identifying a request to program the module.

16. The method of claim 12, wherein the determining step further comprises querying the electronic module for an identification of software stored on the module and for a cyclic redundancy check checksum of the software.

17. The method of claim 12, wherein the determining step further comprises:
- comparing an identification of software stored on the module with an identification of authorized software; and
- comparing a cyclic redundancy check checksum of the software on the module with an expected checksum.

18. The method of claim 12, wherein the detecting step further comprises logging a detection of the programming.

19. A method for detecting an unauthorized programming of an electronic module located onboard a vehicle, comprising the steps of:
- monitoring a vehicle communication bus with an in-vehicle telematics module for messages indicating a start of a programming session for the electronic module;
- detecting a message indicating the start of the programming session for the electronic module;
- querying the electronic module for a software identification after completion of the programming session;
- performing a cyclic redundancy check of software on the electronic module to obtain a checksum;
- communicating the software identification and the checksum from the in-vehicle telematics module to a call center; and
- determining from the software identification and the checksum whether the programming of the module was authorized.

* * * * *